(12) United States Patent
Artzi et al.

(10) Patent No.: US 8,849,947 B1
(45) Date of Patent: Sep. 30, 2014

(54) IT DISCOVERY OF VIRTUALIZED ENVIRONMENTS BY SCANNING VM FILES AND IMAGES

(75) Inventors: Amanuel Ronen Artzi, Framingham, MA (US); Igg Adiwijaya, Fair Lawn, NJ (US); Avshalom Avital, Sde Warburg (IL)

(73) Assignee: EMC Corporation, Hopkinton, MA (US)

( * ) Notice: Subject to any disclaimer, the term of this patent is extended or adjusted under 35 U.S.C. 154(b) by 792 days.

(21) Appl. No.: 12/639,292

(22) Filed: Dec. 16, 2009

(51) Int. Cl.
*G06F 15/16* (2006.01)

(52) U.S. Cl.
USPC .............................................. 709/217; 718/1

(58) Field of Classification Search
USPC ............................................. 709/217; 718/1
See application file for complete search history.

(56) References Cited

U.S. PATENT DOCUMENTS

| | | | |
|---|---|---|---|
| 5,528,516 A | 6/1996 | Yemini et al. | |
| 5,661,668 A | 8/1997 | Yemini et al. | |
| 6,249,755 B1 | 6/2001 | Yemini et al. | |
| 6,868,367 B2 | 3/2005 | Yemini et al. | |
| 7,496,613 B2 | 2/2009 | Raghunath | |
| 2005/0137832 A1 | 6/2005 | Yemini et al. | |
| 2006/0225065 A1* | 10/2006 | Chandhok et al. | 717/168 |
| 2007/0094659 A1* | 4/2007 | Singh et al. | 718/1 |
| 2008/0134175 A1* | 6/2008 | Fitzgerald et al. | 718/1 |
| 2008/0155223 A1* | 6/2008 | Hiltgen et al. | 711/173 |
| 2008/0263658 A1 | 10/2008 | Michael et al. | |

* cited by examiner

*Primary Examiner* — Thomas Dailey
(74) *Attorney, Agent, or Firm* — Krishnendu Gupta; Joseph D'Angelo

(57) ABSTRACT

Information-technology discovery techniques are performed directly on virtual machine files. A discovery system sends directives to a remote host and receives data extracted from the virtual machine files as a result of the remote host responding to the directive. The discovery system extracts discovery information from the received data and sends the discovery information to a discovery repository. The discovery information may include static and dynamic virtualized hardware as well as executing software applications and services within a virtual machine and across multiple virtual machines.

20 Claims, 11 Drawing Sheets

IT DISCOVERY OF VIRTUALIZED ENVIRONMENTS BY SCANNING VM FILES AND IMAGES

FIELD OF THE DISCLOSURE

The present disclosure is generally related to information-technology discovery of virtualized environments.

BACKGROUND

Information-technology (IT) discovery techniques include finding, identifying, documenting, and observing IT resources and the relations between them. IT resources may include computer-related hardware and software as well as information associated with the computer-related hardware and software. IT discovery can be used as part of or in conjunction with other techniques such as Resource Management, Content Management, Compliance Management, and Configuration Management.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

DETAILED DESCRIPTION

Figure 1:
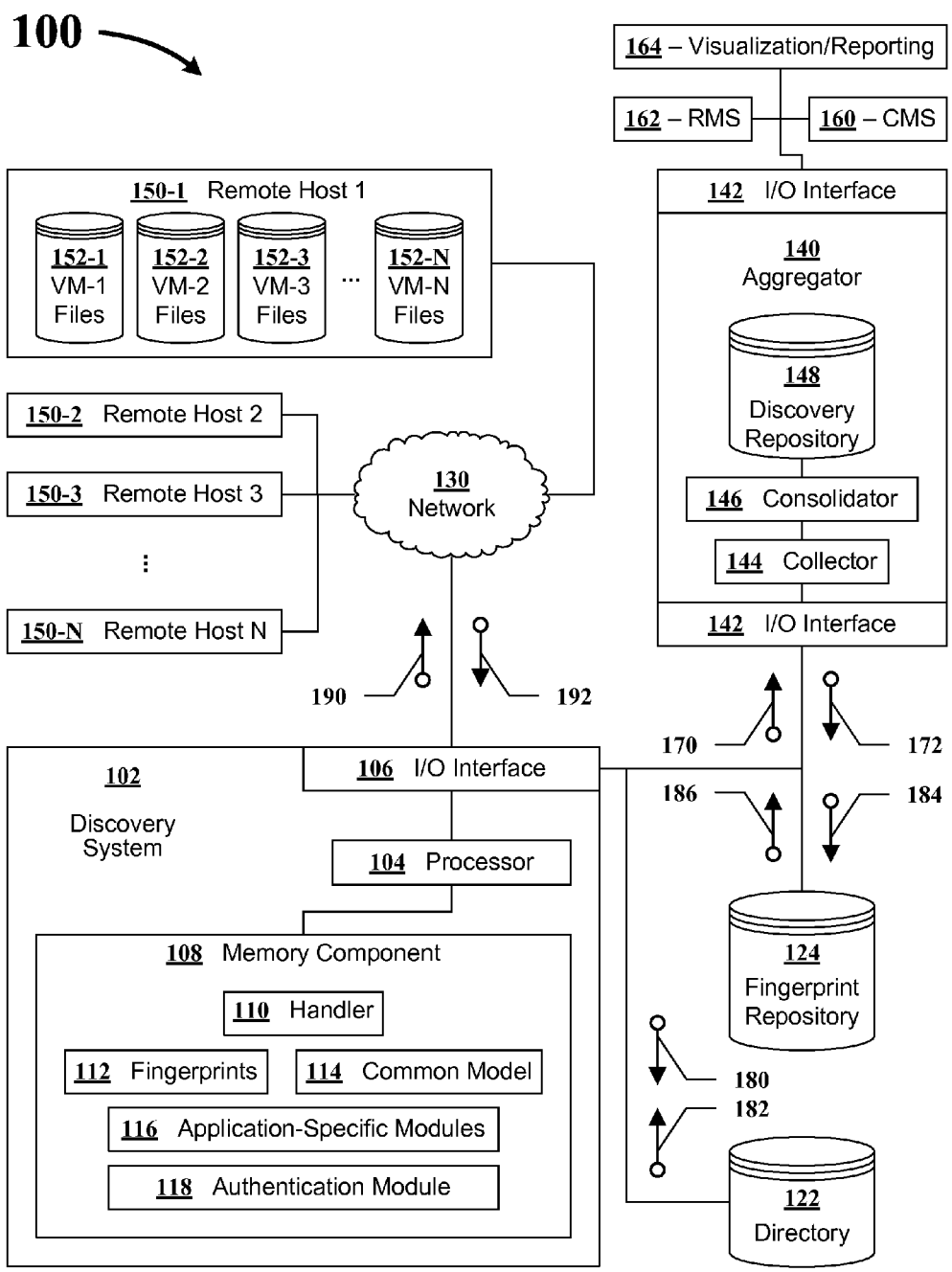
FIG. 1 shows a block diagram of an example embodiment of a system including a discovery system.

Conventional information-technology (IT) discovery of a target virtual machine (VM) and its content requires communication with the target VM. Conventional discovery techniques may require communication with a target VM that is a live/active VM in order to perform discovery techniques such as interacting with the operating system, scanning ports, exploring file systems and memory space, and other discovery techniques, the performance of which allow discovery of configuration items including IT resources such as applications and services running on the target VM. A live VM or an active VM conventionally is one that has been booted up and is running.

Typically, a conventional IT discovery system must provide access credentials to the active target VM in order to perform discovery techniques. The access credentials are typically needed to access the operating system or other services that are used by the conventional IT discovery system. Conventional IT discovery systems can be required to provide different access credentials to each target VM on which discovery is to be performed. This may require assigning access credentials to management entities at the target machine level.

Additionally, performing conventional IT discovery techniques on an active VM may require the active VM to apply resources to perform the discovery techniques. While those resources are being applied to performing discovery techniques, the resources are not being applied to other tasks required of the active VM, making the active VM less efficient in performing the other tasks.

Embodiments disclosed herein deviate from and improve upon conventional IT discovery techniques. Embodiments disclosed herein allow a discovery system to perform IT discovery on VM files instead of being performed on an active VM corresponding to the VM files. VM files as herein referred to include files representing the state of a computing device. Examples of computing devices include virtualized servers, virtualized networking devices, and virtualized storage devices. A virtualized computing device may be referred to herein as a virtual machine. In particular embodiments, VM files as herein referred to include the files comprising a virtual machine image. The virtual machine image may comprise the data required to operate a virtual machine. The virtual machine image may comprise the system files, data files, and file-system information relating to the virtual machine and the operating system within the virtual machine. The virtual machine image may be represented to the host operating system by one or more host files including, for example, virtual hard disk files and configuration files. VM files as herein referred to may include these host files.

The present disclosure provides methods usable for performing IT discovery of virtual machines. In a first particular embodiment, a method is performed by a discovery system. The discovery system establishes a connection to a particular remote host. The particular remote host includes virtual machine files of a particular virtual machine. The discovery system also sends at least one particular directive to the particular remote host via the connection. The discovery system receives data from the particular remote host as a result of a response by the particular remote host to the at least one directive. The received data includes information extracted from at least one of the virtual machine files. The discovery system extracts discovery information from the received data. The discovery information includes configuration information related to the particular virtual machine. The discovery system converts the discovery information into a particular format and sends the converted discovery information to a discovery repository.

The present disclosure provides computer-readable storage media including executable instructions that, when executed by a system, enable the system to perform methods usable for performing IT discovery of virtual machines. In a second particular embodiment, the performed method comprises the method described above with respect to the first particular embodiment.

The present disclosure provides systems usable for performing IT discovery of virtual machines. In a third particular embodiment, a system comprises a processor and a memory component. The memory component is accessible to the processor and the memory component includes executable instructions that, when executed, enable the system to perform the method described above with respect to the first particular embodiment.

FIG. 1 shows a block diagram of an example embodiment of a system 100 including a discovery system 102. The system 100 also includes a network 130, an aggregator 140, a directory 122, a fingerprint repository 124, remote hosts 150-1, 150-2, 150-3, 150-N (generally 150), a content management system (CMS) 160, a resource management system (RMS) 162, and a visualization/reporting system 164.

The discovery system 102 includes a processor 104, an I/O interface 106 accessible to the processor, and a memory component 108 accessible to the processor 104. The I/O interface 106 is configured to enable the discovery system 102 to communicate with other systems either via the network 130 or another communication link. The network 130 may be a wide-area network (WAN) such as the Internet, for example. In particular embodiments, the discovery system 102 may communicate with one or more remote hosts 150 via the network 130 as shown in FIG. 1. In particular embodiments, the discovery system 102 may communicate with the directory 122, the fingerprint repository 124, and the aggregator 140 via the network 130.

The memory component 108 may comprise computer-readable storage media such as random access memory (RAM), secondary storage such as a hard disk drive, removable computer-readable media, or a combination thereof. The memory component 108 includes data and executable instructions that, when executed by the processor 104, enable the discovery system 102 to perform methods disclosed herein. The data and executable instructions may be included in one or more of a handler 110, fingerprints 112, a common model 114, application-specific modules 116, and an authentication module 118.

Each fingerprint 112 contains information useable for discovering information on a target remote host 150. For example, a fingerprint 112 may include a list of elements targeted to be retrieved from a remote host 150. In particular embodiments, fingerprints 112 include one or more executable commands that, when sent to and executed on a remote host 150, outputs information extracted from at least one VM file on the remote host 150. A fingerprint 112 may also include executable instructions that, when executed, extract discovery information from the output. In particular embodiments, the discovery information extracted from the output includes configuration information related to a particular virtual machine. In particular embodiments, the fingerprints 112 are files written in a computer programming language. The computer programming language may be Java, C++, or a scripting language such as Python, Ruby, or Groovy. The discovery system 102 may store fingerprints 112 into the fingerprint repository 124 and retrieve fingerprints 112 from the fingerprint repository 124.

In particular embodiments, fingerprints 112 include information to be provided as input to an application programming interface (API) at a remote host. When the information is input to an API at the remote host, the API may extract information from one or more VM files and return the extracted information to the discovery system 102.

The common model 114 provides a particular format into which discovery information may be converted. The conversion may be done for purposes of normalization and drive consistency. In particular embodiments, the common model 114 includes objects that can be instantiated to represent discovery information retrieved from VM files of a particular VM.

In particular embodiments, each of the application-specific modules 116 includes computer-executable instructions for performing a set of specific operations. For example, the application-specific modules 116 may include a window registry module (not shown) that would function to perform operations on a registry portion of a VM file that includes a Windows operating system. In particular embodiments, the window registry module searches for one or more registry names and values. The window registry module may also perform operations including modifying the registry content, adding a new registry, and extracting content.

By way of another example, the application-specific modules 116 may include an Apache web server module for handling Apache configuration files. In particular embodiments, the Apache web server module includes information related to the location of related files for Apache, can find and read configuration files, can make modifications, can set the start/stop status of Apache, and can add or modify a user web account. Other example application-specific modules 116 may function to interaction with specific database management systems such as from Oracle, for example. Such a module may be able to locate and work on database files, configuration files, user account information, storage settings, and patches.

In preferred embodiments, the application-specific modules 116 are written as plug-and-pay modules that can be added to or removed from the discovery system 102 without having to modify any other part of the discovery system 102. In particular embodiments each module of the application-specific modules 116 provides to the discovery system a list of functions or services that the module can support and the parameters that the functions and services need. The list of functions, services, and parameters can be placed in a registry (not shown) within the discovery system 102 that is available to users of the discovery system 102. In this manner, a user of the discovery system 102 may readily understand the extent of the functionality of the discovery system 102.

The authentication module 118 may include access credentials needed to access VM files. In particular embodiments, the authentication module 118 is accessed by the application-specific modules 116 in order to access VM files. In particular embodiments, the directory 122 includes authentication content needed for accessing VM files. The authentication module 118 may obtain access credentials from the directory 122. The authentication module 118 may also obtain access credentials from discovery requests received at the discovery system 102 and from external sources using lightweight directory access protocol (LDAP), for example. In particular embodiments, the access credentials received using LDAP include credentials to access a remote host 150, any access credentials needed to access VM files at the remote host 150, and access credentials to a VM host environment needed to mount files on the remote host 150.

A remote host 150 may host VM files for many different virtual machines. In particular embodiments, the authentication module 118 include access credentials to the remote host 150 that provides access to all the VM files on the remote host 150. In this manner, the discovery system 102 does not need to maintain access credentials for each virtual machine.

In particular embodiments, the handler 110 includes executable instructions that, when executed, perform as the control logic for the discovery system 102. For example, the handler 110 may invoke one or more fingerprints 112 when needed and may invoke one or more application-specific modules 116 when needed.

The system 100 includes remote hosts 150 accessible to the discovery system 102. Each remote host 150 may include VM files defining one or more VMs. For example, VM-1 files 152-1 defines VM-1, VM files 152-2 defines VM-2, VM files 152-3 defines VM-3, and VM files 152-4 defines VM-4. A remote host 150 may provide an execution environment for a virtual machine. That is, a remote host 150 may have one or more running virtual machines on the remote host 150. However, it is not necessary for the remote host 150 to provide an execution environment for any virtual machine. In particular embodiments, the remote host 150 includes VM files corresponding to many different virtual machines, but does not provide an execution environment for any of the virtual machines. The remote host 150 may be dedicated to providing the discovery system 102 with access to the VM files on the remote host 150.

The system 100 includes an aggregator 140. The aggregator 140 includes an I/O interface 142, allowing the aggregator 140 to communicate with other systems. The aggregator also includes a collector 144, a consolidator 146, and a discovery repository 148. The aggregator 140 is accessible to a content management system 160, a resource management system 162, and a visualization/reporting system 164.

During operation, the discovery system 102 may receive a request 172 from the aggregator 140. The request 172 may include a query. Examples of queries include status queries about the status of one or more virtual machines on one or more remote hosts 150. Examples of queries also include queries about whether any VMs exist on a particular remote host 150. The request 172 may include a discovery request. Examples of discovery requests include requests to collect information, such as configuration information, related to one or more VMs on one or more remote hosts 150. The request 172 may include a remediate/patch request. Examples of remediate/patch requests include requests to modify certain information or aspects related to one or more VMs on one or more remote hosts 150.

In particular embodiments, the handler 110 accesses the fingerprints 112 in response to the discovery system's 102 receiving of the request 172. If necessary, a request 184 may be sent to the fingerprint repository 124 and the discovery system 102 may receive one or more fingerprints 186 from the fingerprint repository 124. The handler 110 may receive from the fingerprints 112 information needed by the handler to respond to the request 172. For example, the request 172 may include a request for discovery information related to software on one or more VMs, where the software is a product of a particular vendor (e.g., Oracle). In particular embodiments, the handler 110 accesses the fingerprints 112 and receives information (e.g., specifications) related to software products from the particular vendor. For example, the handler 110 may receive specifications from the fingerprints 112 identifying what discovery information to look for and how to find the discovery information. For example, the fingerprints 112 may identify what configuration files (e.g., sql.ora, init.ora, etc.) to interrogate, what registry (if Windows is the operating system) to check for, and the directory where user data is stored.

In particular embodiments, the handler 110 establishes a connection to a particular remote host 150. The particular remote host 150 includes VM files of one or more virtual machines. The one or more virtual machines may be active (i.e., running) on the remote host 150 or may be inactive. In particular embodiments, the remote host 150 is a proxy host that includes VM files, but is not a production host on which the virtual machine corresponding to the VM files would actually run.

In particular embodiments, the handler sends one or more requests 180 to the directory 122 for information needed to respond to the request 172 from the aggregator 140. The handler may receive information 182 from the directory 122 in response to sending the one or more requests 180. The information requested from the directory 122 may include, for example, the location (i.e., which remote host 150) of one or more virtual machines. The information requested from the directory 122 may include, for example, access information (e.g., IP address) of one or more remote hosts 150.

In particular embodiments, the handler invokes an application-specific module. The application-specific module may send at least one directive 190 to the particular remote host 150 via the established connection. The directive may be sent in the form of input to an API at the remote host 150. Alternately, the directive 190 may be sent in the form of one or more executable commands to be executed at the remote host 150. For example, the handler 110 may establish a connection to remote host 1 150-1 via the network 130. The application-specific module may send at least one directive 190 to remote host 1 150-1 via the established connection.

In particular embodiments, the directive 190 includes at least one executable command and the remote host 150 executes the at least one executable command. The output of each executed command may include information extracted from the VM files of a particular virtual machine on the remote host 150. The remote host 150 may send data 192 including output from one or more executed commands to the discovery system 102 via the established connection. For example, an application-specific module may send an executable command to remote host 1 150-1 and remote host 1 150-1 may execute the executable command to extract information from VM-2 files 152-2. The extracted information may be sent in data 192 to the discovery system 102.

In particular embodiments, the directive 190 includes input to an API at the remote host 150. The remote host 150 may receive the directive 190 and, in response to the input included in the directive 190, may perform functions at the remote host 150 that extracts information from the VM files of a particular virtual machine on the remote host 150. The remote host 150, via the API, may send data 192 including the extracted information to the discovery system 102 via the established connection.

In particular embodiments, the discovery system 102 receives data 192 from a remote host 150 and the handler 110 may extract discovery information from the received data 192. The extracted discovery information may include configuration information related to a particular virtual machine. The configuration information may include information related to a plurality of configuration items related to the particular virtual machine. In particular embodiments, the configuration items include one or more configuration items representing software items on the particular virtual machine. The software items my include software programs, executing processes, communications sessions with a user of the VM or with a process on another VM. For example, a user may be logged into the VM and interact with a program that has establish a connection with a process on a second VM. In particular embodiments, the configuration items include one or more configuration items representing hardware items on the virtual machine, such as a processor or memory, for example. The hardware items may be virtual hardware. The configuration information may also include information about relationships between configuration items on the VM or between a configuration item on the VM and a configuration item on a second VM.

In particular embodiments, the discovery system 102 converts discovery information extracted from data 192 received from a remote host 150 into a common format. For example, the discovery system 102 may instantiate objects from the common model 114 that represent discovery information received from a remote host 150. The discovery system 102 may then send the converted discovery information to a discovery repository. For example, the discovery system 102 may send converted discovery information 170 to the aggregator 140 to be stored in the discovery repository 148.

In particular embodiments, the aggregator 140 receives converted discovery information 170 from the discovery system 102. The discovery information 170 may be the result of a discovery request, a status query, or a request for remediation (e.g., patching), for example. The collector 144 may accept the discovery information 170. In particular embodiments, the collector 144 time-stamps the accepted discovery information and may place the time-stamped discovery information in a queue (not shown) for further processing.

The consolidator 146 may perform several functions depending on the request 172 to which the discovery information 170 is a response and depending on the nature of the data accepted by the collector 144. For example, the consolidator 146 may perform a mapping function to map the discovery information 170 to an object in the discovery repository 148. If no appropriate object is present in the discovery repository 148, the consolidator 146 may create a new object. The consolidator 146 may perform an aggregation function to combine data from multiple discovery systems 102 to support an object in the discovery repository 148. Additionally, storing aggregated detailed discovery information received from a discovery system 102 in the discovery repository 148 may be desirable. Specific aggregation computations may be performed to facilitate later trending and analytics. The consolidator 146 may perform consolidation functions. For example, pieces of data that constitute a single object may be discovered and arrive at the aggregator 140 at different times. The consolidator 146 may consolidate the pieces of data. The consolidator 146 may perform reconciliation functions. For example, two or more discovery systems 102 may evaluate the same VM file or produce results related to the same VM file. The consolidator 146 may reconcile discovery information from multiple discovery systems 102 before consolidating the discovery information. The consolidator 146 may perform analysis functions. Advanced analysis may need to be performed to extract higher-level information, such as relationships and topology. Such analysis may be useful when an object in one VM file may relate to another object in another VM file. For example, a 3-tier web application may have its web-server, application server, and database located in three different VM images.

The discovery repository 148 may include different types of objects. For example, the discovery repository 148 may include configuration items (CIs), relationships, events and actions, and trends and patterns. In particular embodiments, the discovery repository 148 includes 2 different types of common model for CIs: one common model that is specific within the domain for CIs such as networks, storage, applications, and servers, and another common model for general purpose object types for CIs such as business processes. Relationships between CIs may be captured to provide full topologies. Higher-level relationships between business processes/operations and CIs may be included when applicable. Examples of events and actions include information on the remediation, patching, query, and their status as performed on VM files. The discovery repository 148 may include historical discovery information related to a particular virtual machine that can be used to discover trends and patterns. Information related to CIs and events/actions may be aggregated, summarized, and analyzed to discover trends and patterns.

In particular embodiments, the aggregator 140 is accessible to a content management system (CMS) 160, a resource management system (RMS) 162, and a visualization/reporting system 164. The visualization/reporting system 164 may provide a user interface, allowing the information in the discovery repository 148 to be presented to a user. The CMS 160, RMS 162, and visualization/reporting system 164 may provide inputs to the fingerprint repository 124 to enhance the ability of fingerprints 112 to extract and retrieve information related to VMs.

Figure 2:
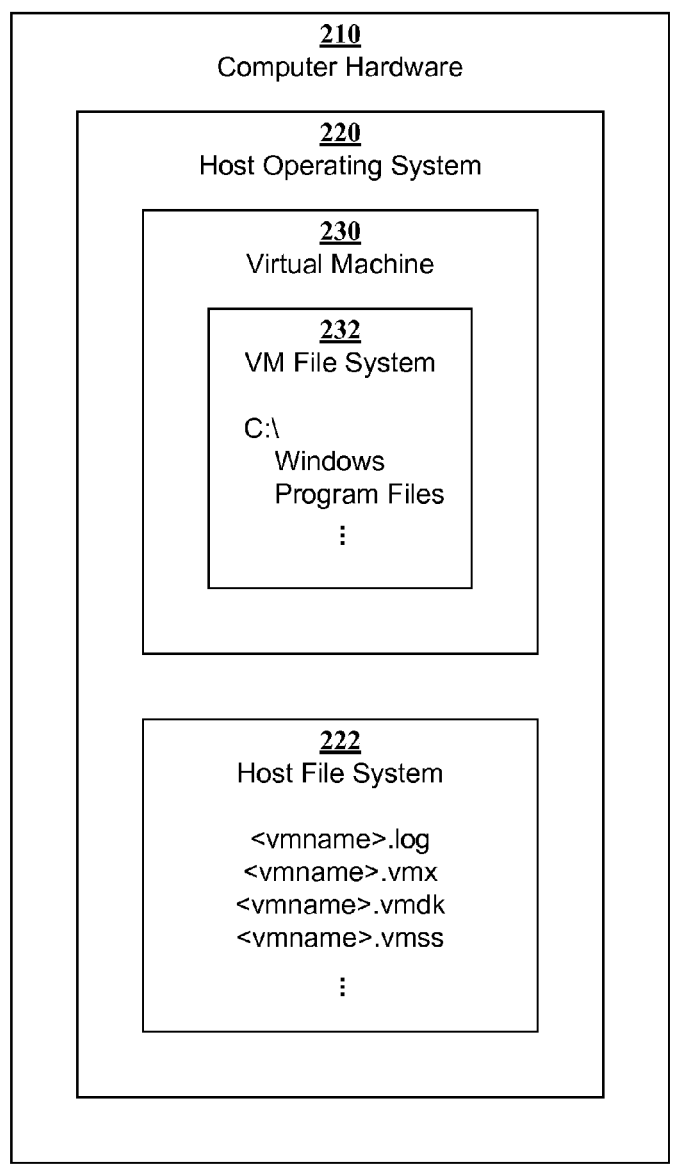
FIG. 2 shows a block diagram of an example embodiment of a remote host including a virtual machine.

FIG. 2 shows a block diagram of an example embodiment of a remote host 200 including a virtual machine 230. The remote host 200 includes computer hardware 210, a host operating system 220 running on the computer hardware 210, and a virtual machine 230 running on the host operating system 220. The remote host 200 may be a remote host 150 shown in FIG. 1. The virtual machine 230 includes a VM file system 232. The VM file system 232 may comprise the data required to operate the virtual machine 230. The VM file system 232 may comprise the system files, data files, and file-system information relating to the virtual machine 230 and an operating system within the virtual machine 230. The VM file system 232 may be included in the VM files of the virtual machine 230. For example, the VM file system 232 may be included in the VM files 152 shown in FIG. 1. The host operating system 220 includes a host file system 222. The virtual machine 230 may be stored on the remote host 200 in a set of files in the host file system 222. For example, the host file system 222 may include a log file (i.e., <vmname>.log) that keeps a log of the virtual machines 230 activity; a configuration file (i.e., <vmname>.vmx), which may be the primary configuration file for the virtual machine 230; a virtual disk file (i.e., <vmname>.vmdk) that stores the contents of the virtual machine's 230 hard disk drive; and a suspend state file (i.e., <vmname>.vmss), which stores the state of a suspended virtual machine 230. The set of files in the host file system 222 may be included in the VM files of the virtual machine 230. For example, the set of files may be included in the VM files 152 shown in FIG. 1. The virtual disk file may represent a physical disk of the virtual machine 230 and may contain system files, data files, and file-system information relating to the virtual machine 230. In particular embodiments, the virtual disk file is mounted on the remote host 200, making the files of the virtual machine's 230 physical disk available to the host operating system 220. When the files are available to the host operating system 220 they can be scanned and discovery information can be extracted from them.

Figure 3:
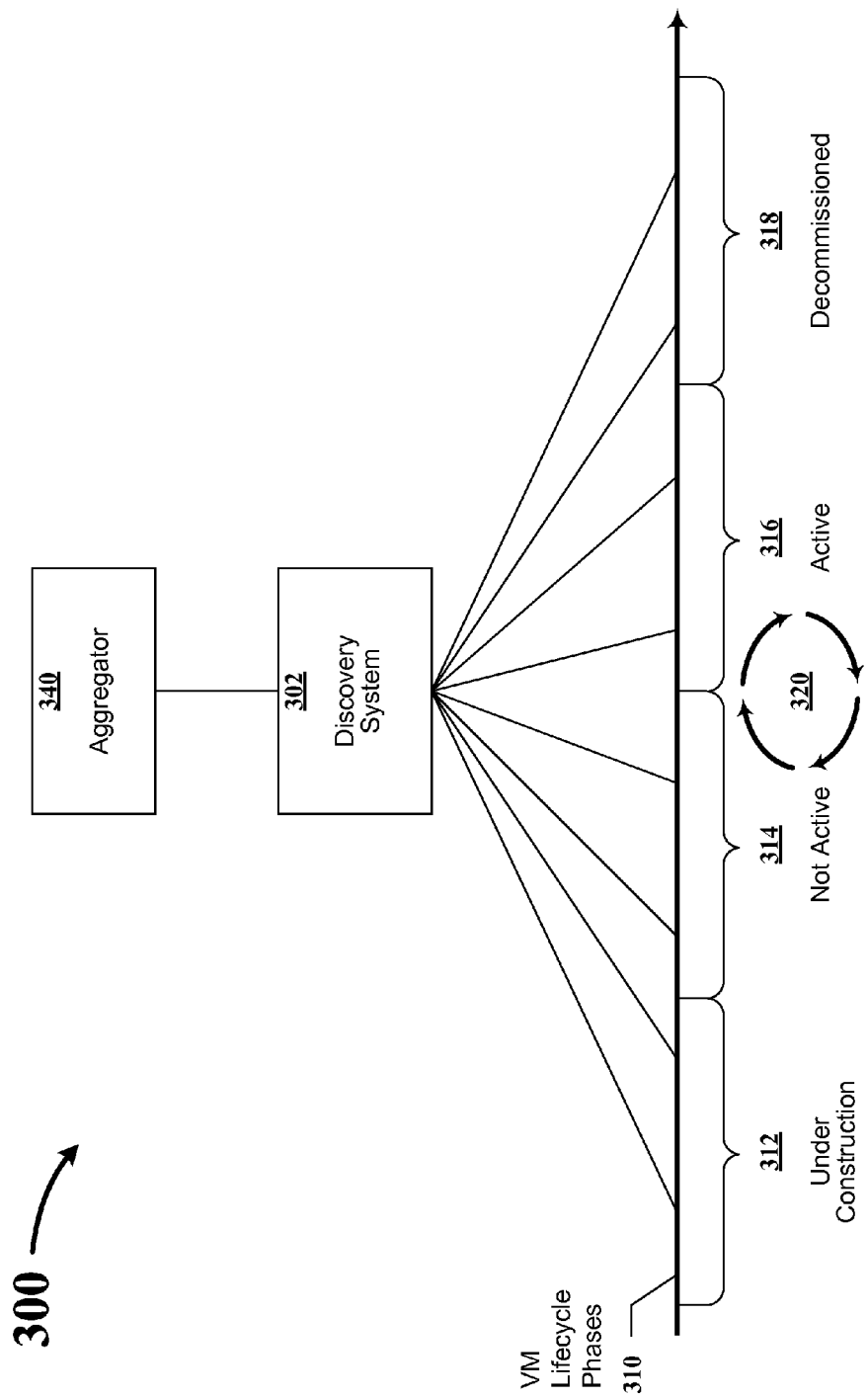
FIG. 3 shows an illustration of a system performing information-technology discovery on different lifecycle phases of a virtual machine.

FIG. 3 shows an illustration of a system 300 performing information-technology discovery on different lifecycle phase 310 of a virtual machine. The system 300 includes an aggregator 340 and a discovery system 302. In a first phase 312, IT discovery may be performed on virtual machine files when the virtual machine is under construction. That is, IT discovery, remediation, and patching may be performed on the VM files of a virtual machine while the virtual machine is still being developed, including VM templates that may serve as a base on which other VMs may be built. This may be useful, for example, to catch incompatibilities or other defects in the virtual machine or virtual machine template before it is rolled out to a customer or a production system. In a second phase 314, IT discovery, remediation, and patching may be performed on the VM files of a virtual machine that is inactive. This can be the case when construction of a virtual machine is complete, but the virtual machine has not yet run in a production environment. Alternately, the virtual machine may have previously run in a production environment, but currently the virtual machine may be temporarily taken down. When a virtual machine is not active, the VM image (i.e., the VM files) will reflect the current state of the virtual machine at the time the virtual machine was taken down or suspended. In a third phase 316, IT discovery, remediation, and patching may be performed on the VM files of a virtual that is active. For example, the virtual machine may be running in a production environment and the VM files may comprise a snapshot of the virtual machine taken at a particular point in time. During this phase 316, the discovered information may include "live" connections to other machines and processes. A virtual machine may cycle 320 between being an active virtual machine and being an inactive virtual machine. In a fourth phase 318, IT discovery, remediation, and patching may be performed on a virtual machine that has been decommissioned. Performing IT discovery in the second phase 314 and the fourth phase 318 may be useful in performing forensic studies on the virtual machine. For example, the virtual machine may have been decommissioned because of malfunctions or other undesirable behavior. The forensic studies may facilitate a discovery of what circumstances caused the malfunctions or other undesirable behavior. Remediation and patching may not be necessary on a virtual machine that has been decommissioned. However, if appropriate remediation and patching is discovered, the virtual machine may be fixed and allowed to become active again. Performing IT discovery in the second phase 314 and the fourth phase 318 may be useful for asset management for licensing purposes.

Figure 4:
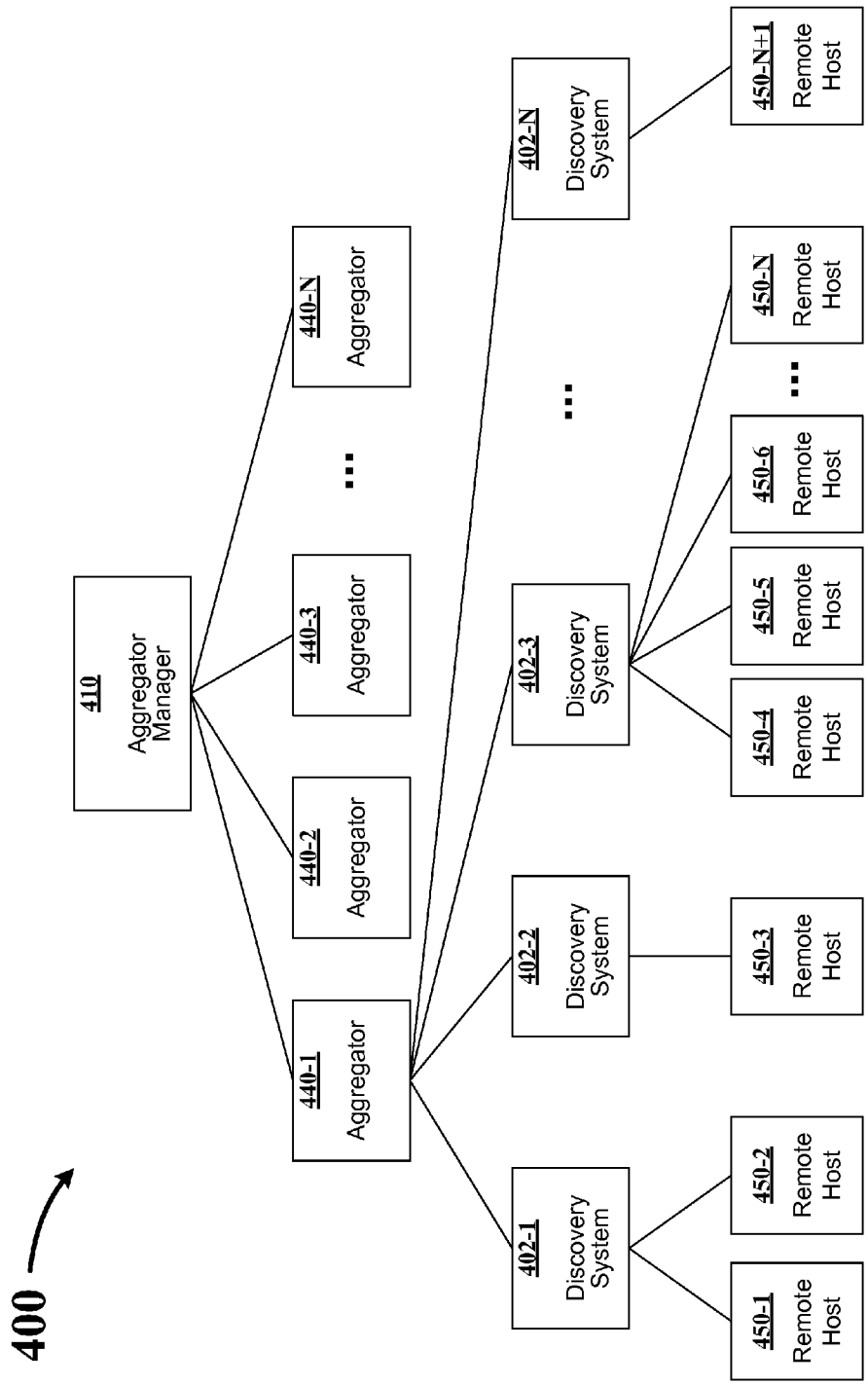
FIG. 4 shows a block diagram of an example embodiment of a system including a plurality of discovery systems.

FIG. 4 shows a block diagram of an example embodiment of a system 400 including a plurality of discovery systems 402. The system 400 includes an aggregator manager 410 connected to a plurality of aggregators 440. A first aggregator 440-1 is connected to a plurality of discovery systems 402. Each discovery system 402 may perform IT discovery for virtual machines (not shown) on one or more remote hosts 450. For example, the discovery system 402-2 performs IT discovery for virtual machines on a single host 450-3, the discovery system 402-1 performs IT discovery for virtual machines on two remote hosts 450-1, 450-2, and the discovery system 402-3 performs IT discovery for virtual machines on N−3 remote hosts 450-4 to 450-N. The aggregator 440-1 may receive discovery information from all the discovery systems 402, allowing the aggregator 440-1 to perform functions that require a comparison between discovery information obtained from different discovery systems 402. In particular embodiments, the aggregator manager 410 can provide a single interface to a user to enable the user to view the environment across all aggregator's 440.

Figure 5:
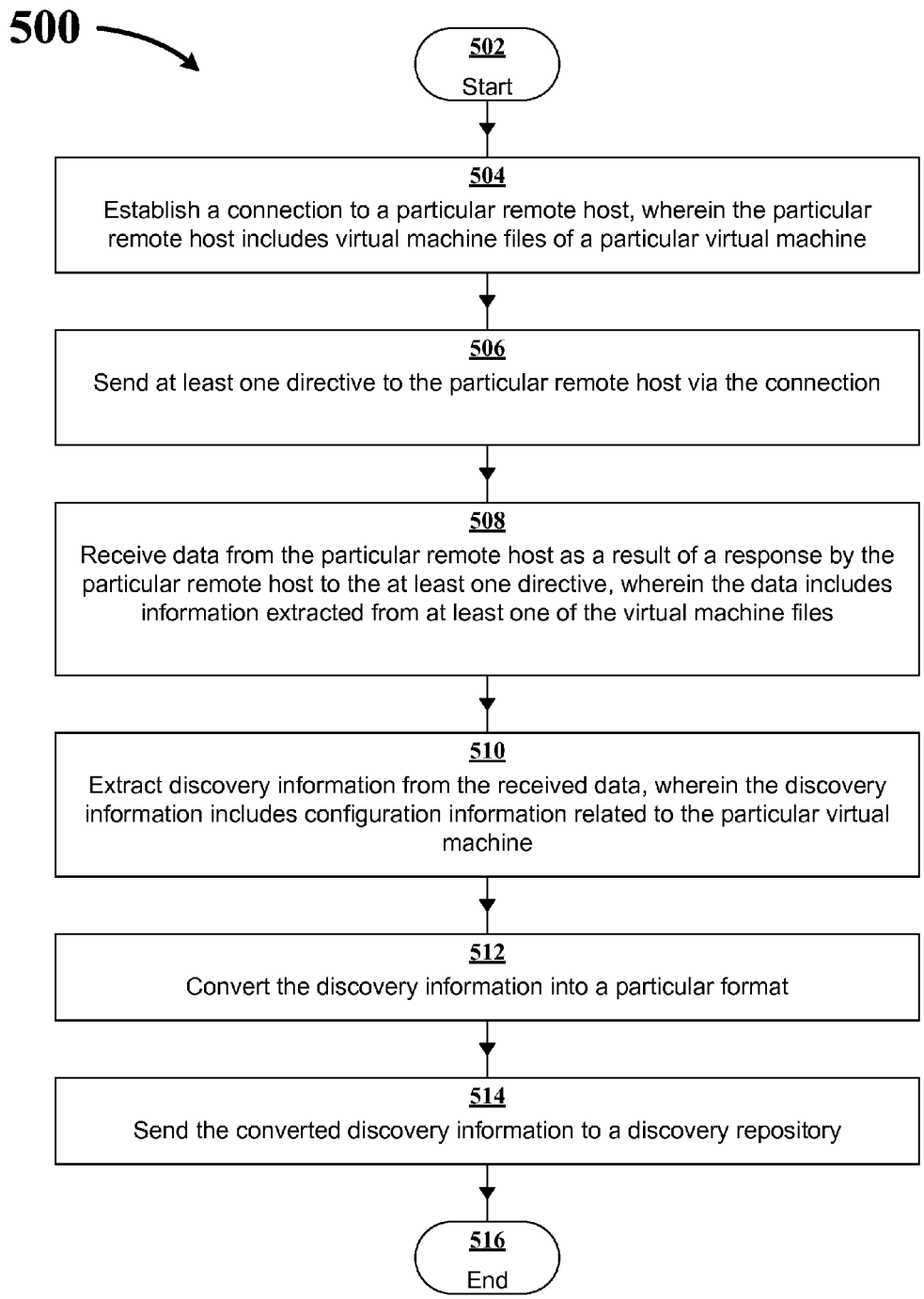
FIG. 5 shows a flow diagram of an example embodiment of a method useable to perform IT discovery related to a virtual machine on a remote host.

FIG. 5 shows a flow diagram of an example embodiment of a method 500 usable to perform IT discovery related to a virtual machine on a remote host. The first method 500 may be performed by a discovery system, such as the discovery system 102 shown in FIG. 1, the discovery system 302 shown in FIG. 3, or a discovery system 402 shown in FIG. 4. Although the flow diagram shows operations proceeding sequentially, in particular embodiments, a later operation may start before a previous operation is complete.

The method 500 starts at 502. At 504, the discovery system establishes a connection to a particular remote host. The particular remote host may be a remote host 150 shown in FIG. 1 or a remote host 450 shown in FIG. 4. The particular remote host includes virtual machine files of a particular virtual machine. The virtual machine files may include files that are included in a mounted file system of the particular virtual machine. The particular virtual machine may or may not be active on the particular remote host. The remote host may or may not include the same hardware that provides the execution environment for the particular virtual machine.

At 506, the discovery system sends at least one directive to the particular host via the connection. The at least one directive may be the at least one directive 190 shown in FIG. 1, for example. The at least one particular executable command may be identified, for example, by fingerprints such as the fingerprints 112 shown in FIG. 1.

At 508, the discovery system receives data from the particular remote host as a result of a response by the particular remote host to the at least one directive. The data includes information extracted from at least one of the virtual machine files.

At 510, the discovery system extracts discovery information from the received data. The discovery information includes configuration information related to the particular virtual machine. The configuration information may include applications installed on the virtual machine, processes executing on the virtual machine, live connections on the virtual machine, as well as relationships between such applications, processes, and connections and other applications, processes, and connections on either the same virtual machine or on another machine whether virtual or not. The discovery system converts the discovery information into a particular format, at 512. At 514, the discovery system sends the converted discovery information to a discovery repository. The converted discovery information may be the converted discovery information 170 shown in FIG. 1, for example. The discovery repository may be the discovery repository 148 shown in FIG. 1, for example. At 516, the first method ends.

Figure 6:
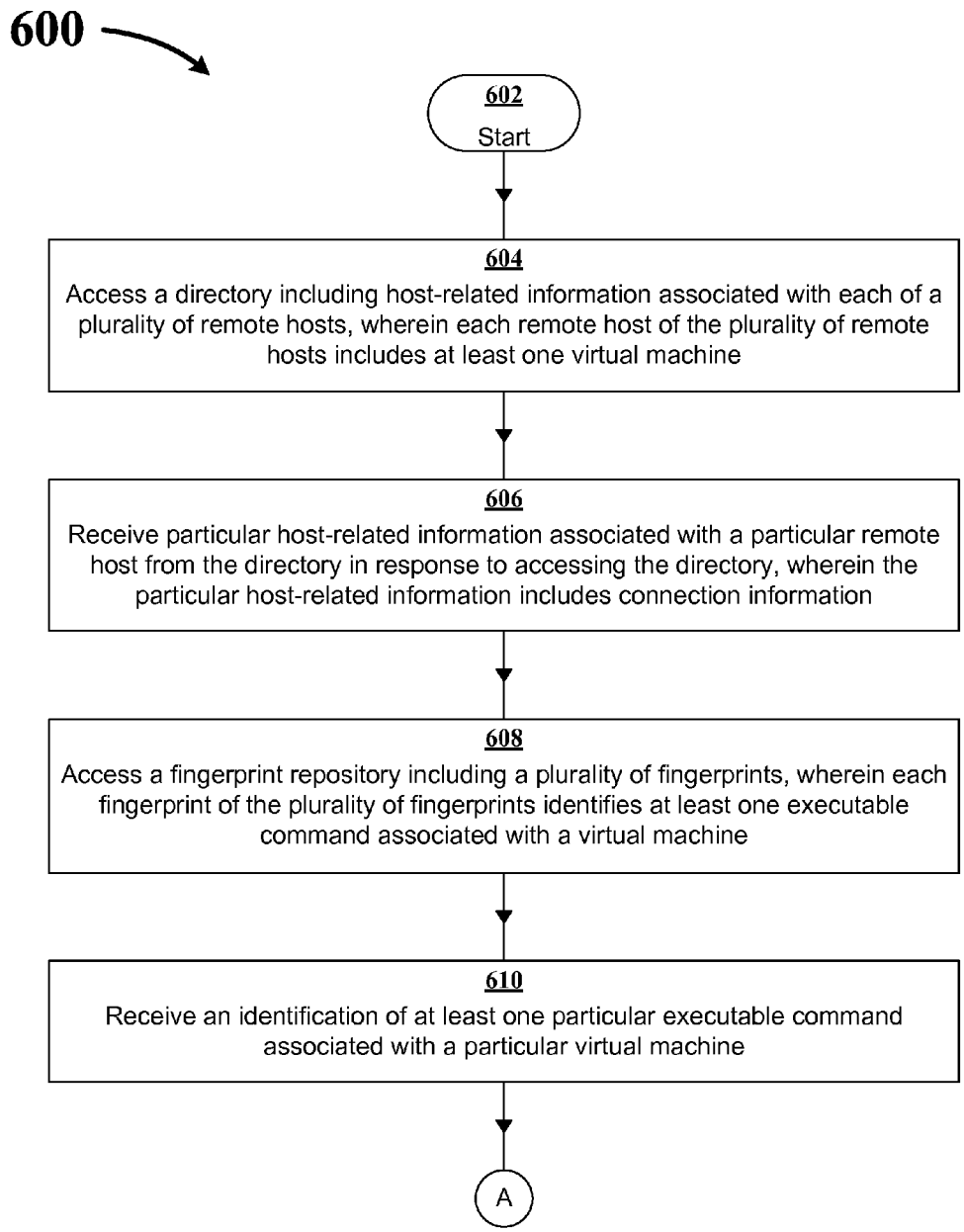
FIGS. 6-8 show a flow diagram of an example embodiment of a method usable to perform IT discovery and remediation related to a virtual machine on a remote host.
Figure 7:
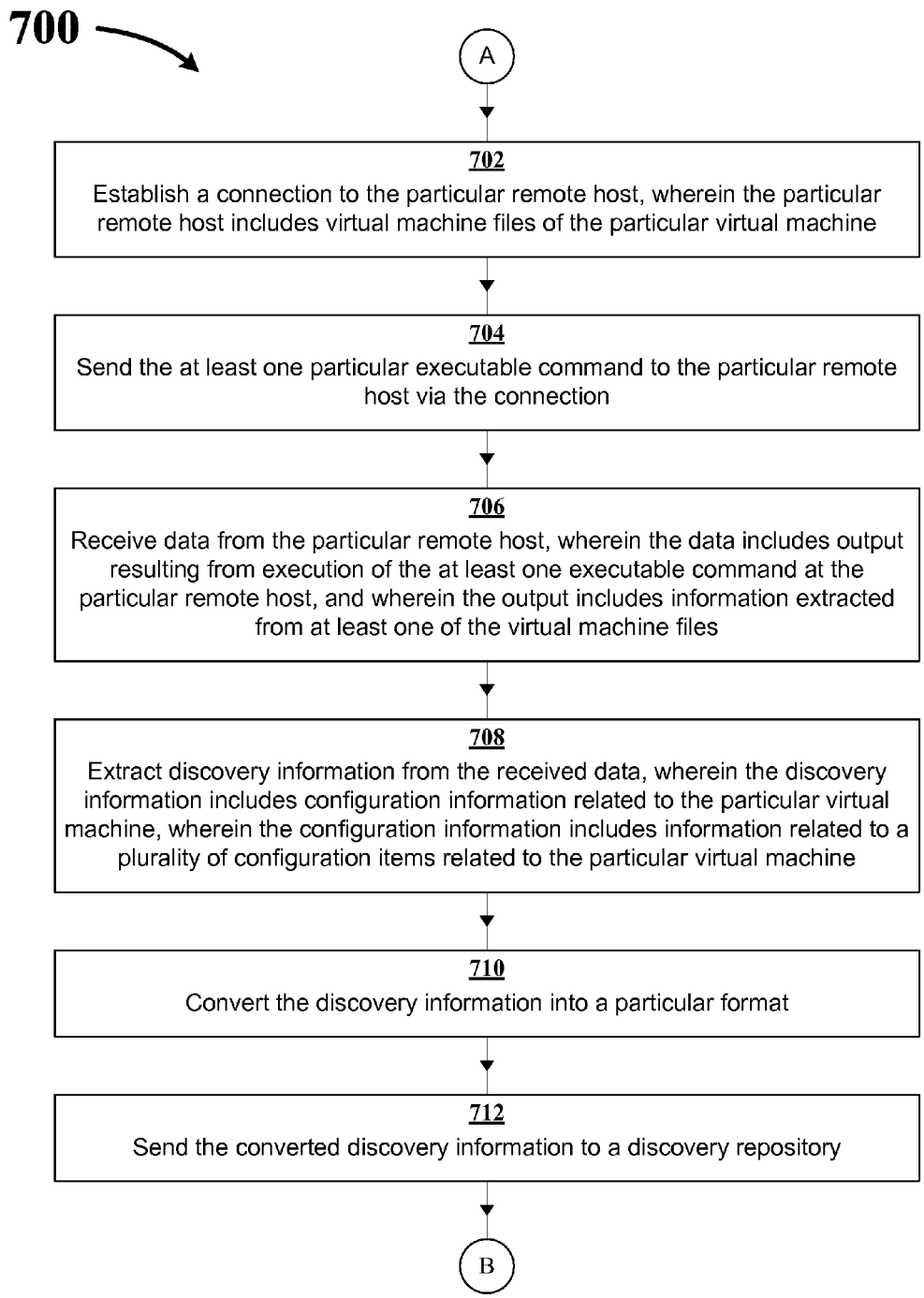
Figure 8:
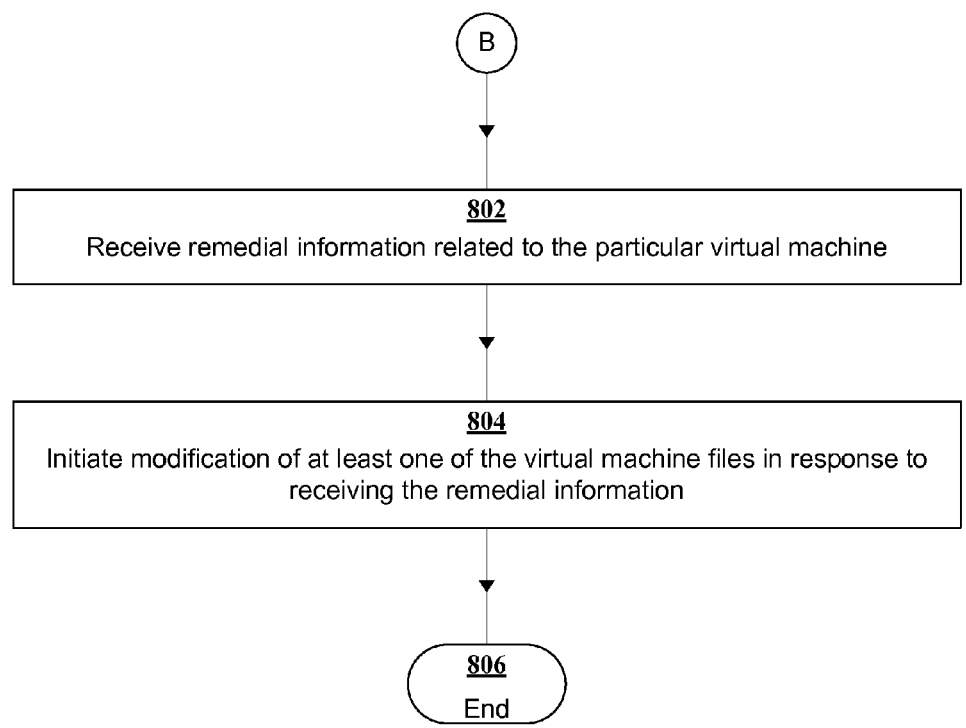

FIGS. 6-8 show a flow diagram of an example embodiment of a method 600 usable to perform IT discovery and remediation related to a virtual machine on a remote host. The method 600 may be performed by a discovery system, such as the discovery system 102 shown in FIG. 1, the discovery system 302 shown in FIG. 3, or a discovery system 402 shown in FIG. 4. Although the flow diagram shows operations proceeding sequentially, in particular embodiments, a later operation may start before a previous operation is complete.

The method 600 starts at 602. At 604, the discovery system accesses a directory including host-related information associated with each of a plurality of remote hosts. Each remote host of the plurality of remote hosts includes at least one virtual machine. By including at least one virtual machine it is meant that the VM files for at least one virtual machine are present on the remote host. The virtual machine may be active or inactive on the remote host. The directory may be the directory 122 shown in FIG. 1, for example. The plurality of remote hosts may be the remote hosts 150 shown in FIG. 1 or the remote hosts 450 shown in FIG. 4, for example. At 606, the discovery system receives particular host-related information associated with a particular remote host from the directory in response to accessing the directory. The host-related information includes connection information.

At 608, the discovery system accesses a fingerprint repository including a plurality of fingerprints. Each fingerprint of the plurality of fingerprints identifies at least one executable command associated with a virtual machine. The fingerprint repository may be the fingerprint repository 124 shown in FIG. 1, for example. At 610, the discovery system receives an identification of at least one particular executable command associated with a particular virtual machine. The identified at least one particular executable command may be the at least one directive 190 shown in FIG. 1, for example.

At 702, the discovery system establishes a connection to a particular remote host. The particular remote host may be a remote host 150 shown in FIG. 1 or a remote host 450 shown in FIG. 4, for example. The particular remote host includes virtual machine files of the particular virtual machine. The particular virtual machine may or may not be active on the particular remote host.

At 704, the discovery system sends at least one particular executable command to the particular host via the connection. The at least one particular executable command may be the at least one directive 190 shown in FIG. 1, for example.

At 706, the discovery system receives data from the particular remote host. The data includes output resulting from execution of the at least one executable command at the remote host. The output includes information extracted from at least one of the virtual machine files.

At 708, the discovery system extracts discovery information from the received data. The discovery information includes configuration information related to the particular virtual machine. The configuration information includes information related to a plurality of configuration items related to the particular virtual machine. The discovery system converts the discovery information into a particular format, at 710. At 712, the discovery system sends the converted discovery information to a discovery repository. The converted discovery information may be the converted discovery information 170 shown in FIG. 1, for example. The discovery repository may be the discovery repository 148 shown in FIG. 1, for example.

At 802, the discovery system receives remedial information related to the particular virtual machine. In particular embodiments, the remedial information includes patches for fixing or repairing the particular virtual machine. At 804, the discovery system initiates modification of at least one of the virtual machine files of the particular virtual machine in response to receiving the remedial information. At 806, the second method ends.

Figure 9:
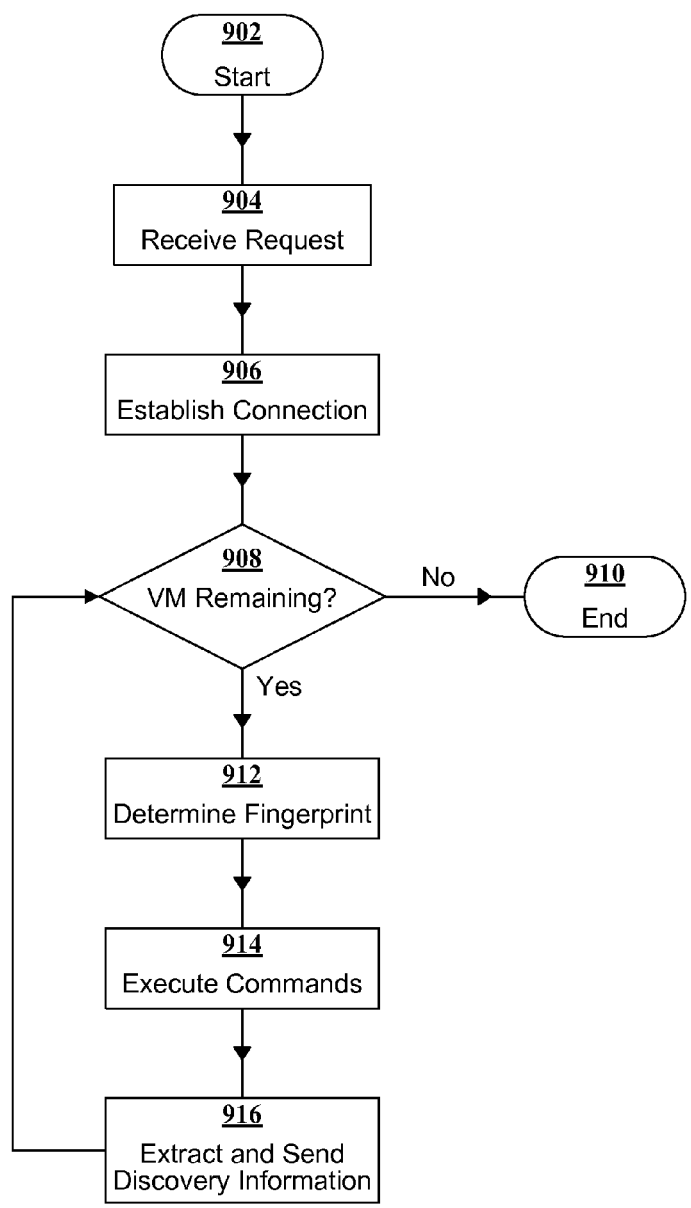
FIG. 9 shows a flow diagram of an example embodiment of a method usable to perform IT discovery related to virtual machines on a remote host.

FIG. 9 shows a flow diagram of an example embodiment of a method 900 usable to perform IT discovery related to virtual machines on a remote host. The remote host may be a remote host 150 shown in FIG. 1 or a remote host 450 shown in FIG. 4, for example. The method 900 may be performed by a discovery system, such as the discovery system 102 shown in FIG. 1, the discovery system 302 shown in FIG. 3, or a discovery system 402 shown in FIG. 4.

The method 900 starts at 902. At 904, the discovery system receives a request. The request includes a request to perform IT discovery for all virtual machines on a particular remote host. The request may be a request 172 received from the aggregator 140 as shown in FIG. 1, for example.

At 906, the discovery system establishes a connection to the particular remote host. In particular embodiments, a single connection is established using a single set of access credentials in order to perform discovery on VM files of a plurality of virtual machines. The discovery system determines whether there remain virtual machines on the particular remote host for which IT discovery needs to be performed, at 908. If no virtual machines remain, the third method 900 proceeds to 910 and ends. If virtual machines remain, the third method 900 proceeds to 912.

At 912, the discovery system determines at least one appropriate fingerprint for a remaining virtual machine. The at least one fingerprint may be one or more of the fingerprints 112 shown in FIG. 1, for example. At 914, the discovery system sends at least one executable command identified by the at least one appropriate fingerprint to the particular remote host to be executed at the remote host and receives data from the particular remote host resulting from execution of the at least one executable command at the particular remote host. The at least one executable command may be the at least one directive 190 shown in FIG. 1, for example. The received data may be the received data 192 shown in FIG. 1, for example.

At 916, the discovery system extracts discovery information from the received data and sends the discovery information to a discovery repository. The discovery information may be the discovery information 170 shown in FIG. 1, for example. The discovery repository may be the discovery repository 148 shown in FIG. 1, for example. From 916, the method 900 proceeds to 908.

Figure 10:
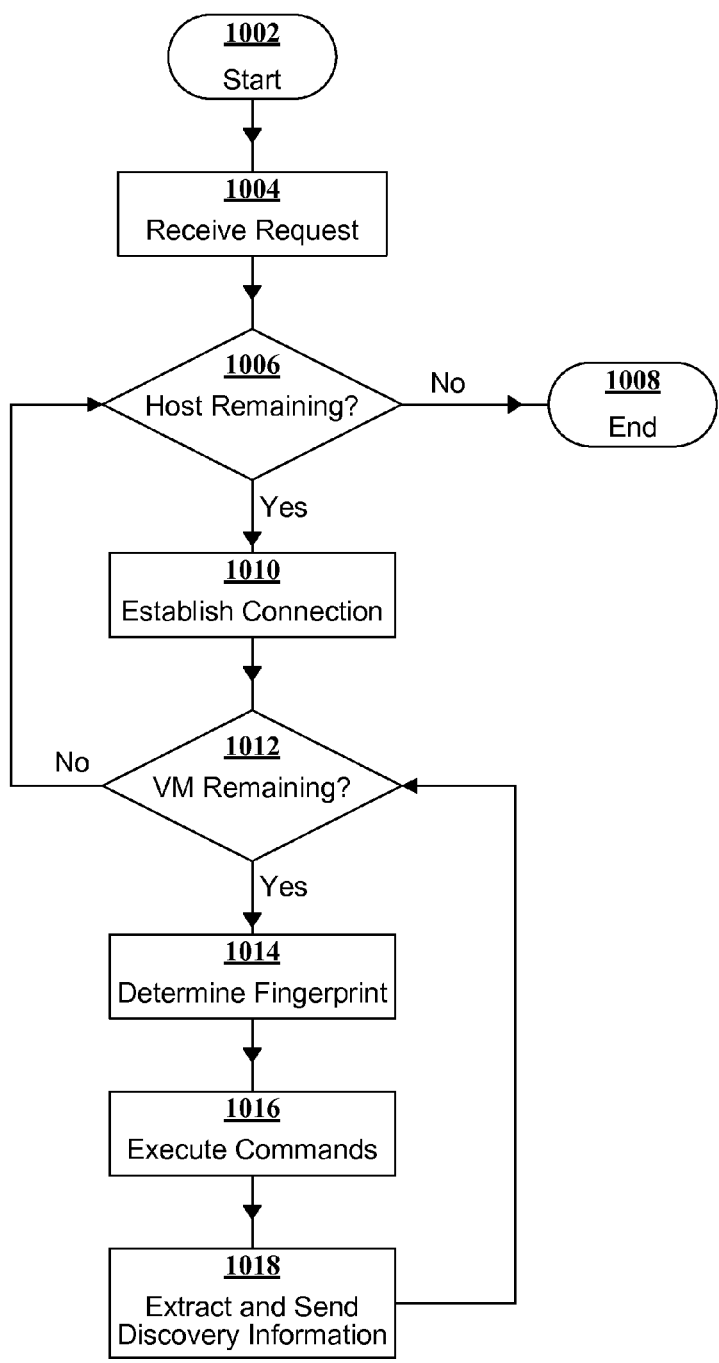
FIG. 10 shows a flow diagram of an example embodiment of a method usable to perform IT discovery related to virtual machines on a plurality of remote hosts.

FIG. 10 shows a flow diagram of an example embodiment of a method 1000 to obtain discovery information related to virtual machines on a plurality of remote hosts. The remote hosts may be the remote hosts 150 shown in FIG. 1 or the remote hosts 450 shown in FIG. 4, for example. The method 1000 may be performed by a discovery system, such as the discovery system 102 shown in FIG. 1, the discovery system 302 shown in FIG. 3, or a discovery system 402 shown in FIG. 4.

The method 1000 starts at 1002. At 1004, the discovery system receives a request. The request includes a request to perform IT discovery for all virtual machines on a plurality of remote hosts. The request may be a request 172 received from the aggregator 140 as shown in FIG. 1, for example.

At 1006, the discovery system determines whether remote hosts remain for which IT discovery needs to be performed. If no remote hosts remain, the method 1000 proceeds to 1008 and ends. If remote hosts remain, the method 1000 proceeds to 1010. At 1010, the discovery system establishes a connection to a remote host.

Proceeding to 1012, the discovery system determines whether there remain virtual machines on the remote host for which IT discovery needs to be performed. If no virtual machines remain, the method 1000 proceeds to 1006. If virtual machines remain, the method 1000 proceeds to 1014

At 1014, the discovery system determines at least one appropriate fingerprint for a remaining virtual machine. The at least one fingerprint may be one or more of the fingerprints 112 shown in FIG. 1, for example. At 1016, the discovery system sends at least one executable command identified by the at least one appropriate fingerprint to the remote host to be executed at the remote host and receives data from the particular remote host resulting from execution of the at least one executable command at the particular remote host. The at least one executable command may be the at least one directive 190 shown in FIG. 1, for example. The received data may be the received data 192 shown in FIG. 1, for example.

At 1018, the discovery system extracts discovery information from the received data and sends the discovery information to a discovery repository. The discovery information may be the discovery information 170 shown in FIG. 1, for example. The discovery repository may be the discovery repository 148 shown in FIG. 1, for example. From 1018, the method 1000 proceeds to 1012.

Figure 11:
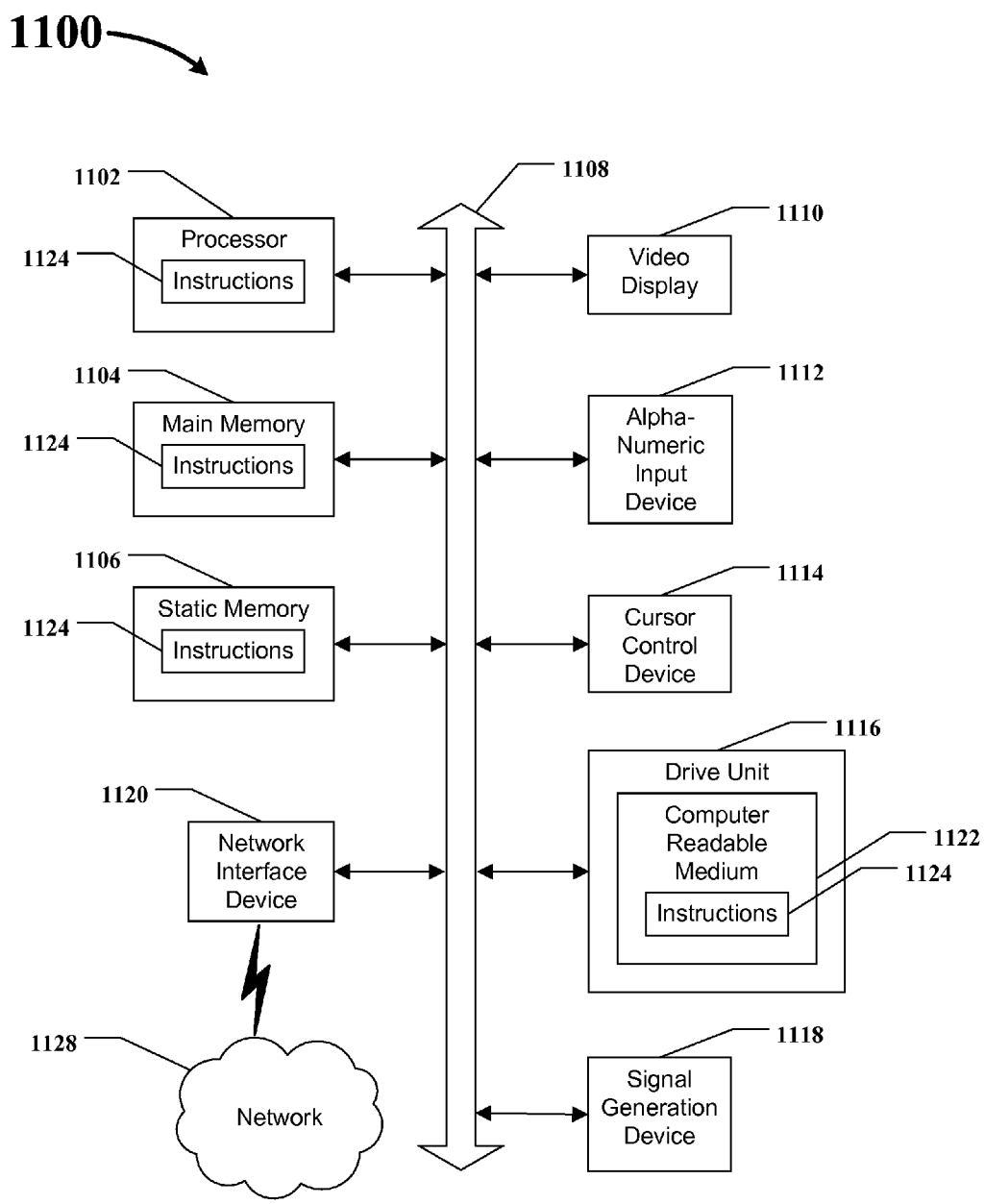
FIG. 11 shows a block diagram of an example embodiment of a general computer system.

FIG. 11 shows a block diagram of an example embodiment of a general computer system 1100. The computer system 1100 can include a set of instructions that can be executed to cause the computer system 1100 to perform any one or more of the methods or computer-based functions disclosed herein. For example, the computer system 1100 may include executable instructions to perform the methods discussed with respect to FIGS. 5-10. In particular embodiments, the computer system 1100 includes executable instructions to implement the discovery system 102 shown in FIG. 1, the discovery system 302 shown in FIG. 3, or a discovery system 402 shown in FIG. 4. In a particular embodiment, the computer system 1100 includes or is included within the discovery system 102 shown in FIG. 1, the discovery system 302 shown in FIG. 3, or a discovery system 402 shown in FIG. 4. In particular embodiments, the computer system 1100 includes or is included within an aggregator, such as the aggregator 140 shown in FIG. 1, the aggregator 340 shown in FIG. 3, or an aggregator 440 shown in FIG. 4. The computer system 1100 may be connected to other computer systems or peripheral devices via a network, such as the network 130 shown in FIG. 1. Additionally, the computer system 1100 may include or be included within other computing devices.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), a projection television display, a flat panel display, a plasma display, or a solid state display. Additionally, the computer system 1100 may include an input device 1112, such as a remote control device having a wireless keypad, a keyboard, a microphone coupled to a speech recognition engine, a camera such as a video camera or still camera, or a cursor control device 1114, such as a mouse device. The computer system 1100 can also include a disk drive unit 1116, a signal generation device 1118, such as a speaker, and a network interface device 1120. The network interface 1120 enables the computer system 1100 to communicate with other systems via a network 1126. The network interface 1120 may be the I/O interface 106 shown in FIG. 1, for example. The network interface 1120 may enable the discovery system to communicate with remote hosts 150 as shown in FIG. 1, the aggregator 340 as shown in FIG. 3, or an aggregator 440 as shown in FIG. 4.

In a particular embodiment, as depicted in FIG. 11, the disk drive unit 1116 may include a computer-readable medium 1122 in which one or more sets of instructions 1124, e.g. software, can be embedded. For example, one or more modules, such as the handler 110 or the application-specific modules shown in FIG. 1 can be embedded in the computer-readable medium 1122. Further, the instructions 1124 may embody one or more of the methods, such as the methods disclosed with respect to FIGS. 5-10, or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

In the foregoing detailed description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the detailed description, with each claim standing on its own as defining separately claimed subject matter.

What is claimed is:

1. A method comprising:
   establishing a connection to a particular remote host, wherein the particular remote host includes virtual machine files of a particular virtual machine;
   locating a fingerprint for the virtual machine from a fingerprint repository; wherein the fingerprint includes at least one directive for the virtual machine and execution of the at least one directive outputs information extracted from the virtual machine regardless if the virtual machine is running;
   sending the at least one directive to the particular remote host via the connection;
   executing the at least one directive;
   receiving data from the particular remote host as a result of a response by the particular remote host to the at least one directive, wherein the data includes information extracted from at least one of the virtual machine files;

extracting discovery information from the received data, wherein the discovery information includes configuration information related to the particular virtual machine;

converting the discovery information into a particular format; and sending the converted discovery information to a discovery repository.

2. The method of claim 1, wherein the at least one directive includes at least one executable command.

3. The method of claim 1, wherein the at least one directive includes input to an application programming interface.

4. The method of claim 1, wherein the configuration information includes information related to a plurality of configuration items related to the particular virtual machine.

5. The method of claim 4, wherein the plurality of configuration items include one or more configuration items representing software items and hardware items on the virtual machine.

6. The method of claim 1, wherein the discovery repository is accessible to a content management system.

7. The method of claim 1, wherein the discovery repository is accessible to a resource management system.

8. The method of claim 6, wherein the discovery repository is accessible to a resource management system.

9. The method of claim 1, wherein the discovery repository includes historical converted discovery information related to the particular virtual machine.

10. The method of claim 1, wherein the discovery repository includes converted discovery information related to a plurality of virtual machines.

11. The method of claim 9, wherein the discovery repository includes converted discovery information related to a plurality of virtual machines.

12. The method of claim 1, further comprising receiving remedial information related to the particular virtual machine.

13. The method of claim 12, further comprising initiating modification of at least one of the virtual machine files in response to receiving the remedial information.

14. The method of claim 1, further comprising: accessing a directory including host-related information associated with each of a plurality of remote hosts including the particular remote host, prior to establishing the connection to the particular remote host, wherein each remote host of the plurality of remote hosts includes at least one virtual machine; and receiving particular host-related information associated with the particular remote host from the directory in response to accessing the directory, wherein the particular host-related information includes connection information.

15. The method of claim 1, further comprising: accessing a fingerprint repository including a plurality of fingerprints prior to establishing the connection to the particular remote host, wherein each fingerprint of the plurality of fingerprints identifies at least one directive; and receiving an identification of the at least one directive sent to the particular host in response to accessing the fingerprint repository.

16. A non-transitory computer-readable storage medium including executable instructions that, when executed by a system, enable the system to perform a method comprising:

establishing a connection to a particular remote host, wherein the particular remote host includes virtual machine files of a particular virtual machine; locating a fingerprint for the virtual machine from a fingerprint repository; wherein the fingerprint includes at least one directive for the virtual machine and execution of the at least one directive outputs information extracted from the virtual machine regardless if the virtual machine is running;

sending the at least one directive to the particular remote host via the connection;

executing the at least one directive;

receiving data from the particular remote host as a result of a response by the particular remote host to the at least one directive, wherein the data includes information extracted from at least one of the virtual machine files;

extracting discovery information from the received data, wherein the discovery information includes configuration information related to the particular virtual machine;

converting the discovery information into a common format; sending the converted discovery information to a repository;

receiving remedial information related to the particular virtual machine; and initiating modification of at least one of the virtual machine files in response to receiving the remedial information.

17. A system comprising: a processor; a memory component accessible to the processor, wherein the memory component includes executable instructions that, when executed, cause the system to perform a method comprising:

establishing a connection to a particular remote host, wherein the particular remote host includes virtual machine files of a particular virtual machine;

locating a fingerprint for the virtual machine from a fingerprint repository; wherein the fingerprint includes at least one directive for the virtual machine and execution of the at least one directive outputs information extracted from the virtual machine regardless if the virtual machine is running;

sending the at least one directive to the particular remote host via the connection;

executing the at least one directive;

receiving data from the particular remote host as a result of a response by the particular remote host to the at least one directive, wherein the data includes information extracted from at least one of the virtual machine files;

extracting discovery information from the received data, wherein the discovery information includes configuration information related to the particular virtual machine;

converting the discovery information into a particular format; and sending the converted discovery information to a repository.

18. The system of claim 17, wherein the method further comprises: receiving remedial information related to the particular virtual machine; and initiating modification of at least one of the virtual machine files in response to receiving the remedial information.

19. The system of claim 17, wherein the method further comprises: accessing a directory including host-related information associated with each of a plurality of remote hosts including the particular remote host, prior to establishing the connection to the particular remote host, wherein each remote host of the plurality of remote hosts includes at least one virtual machine; receiving particular host-related information associated with the particular remote host from the directory in response to accessing the directory, wherein the particular host-related information includes connection information; accessing a fingerprint repository including a plurality of fingerprints prior to establishing the connection to the particular remote host, wherein each fingerprint of the plurality of fingerprints identifies the at least one directive; and receiving an identification of the at least one directive sent to the particular host in response to accessing the fingerprint repository.

20. The system of claim 19, further comprising: the directory; and the fingerprint repository.

* * * * *